Dec. 22, 1936.  F. H. NEWMAN  2,065,149
TEA INFUSER
Filed Sept. 29, 1932
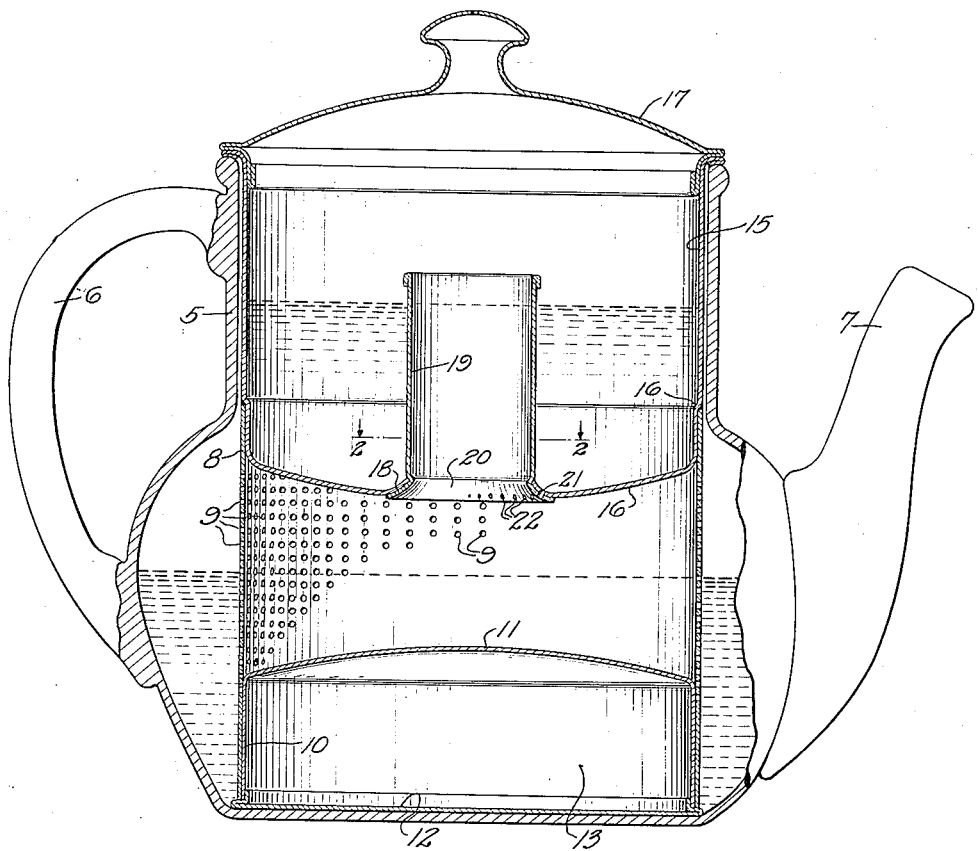
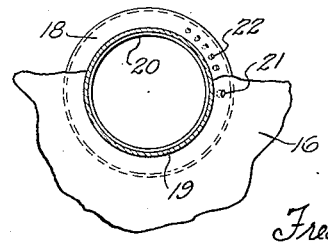
INVENTOR.
Frederick Hills Newman,
BY
Morsell, Lieber & Morsell
ATTORNEYS Patented Dec. 22, 1936

2,065,149

UNITED STATES PATENT OFFICE 2,065,149

TEA INFUSER

Frederick Hills Newman, Milwaukee, Wis.

Application September 29, 1932, Serial No. 635,330

2 Claims. (Cl. 53—3)

This invention relates to tea infusers and has for one of its objects to provide a device of this character in which the tea leaves may be steeped in the water for predetermined periods of time which may be varied according to the fineness of the leaves being employed, at the expiration of which period, the said leaves will be automatically withdrawn from the water and the steeping discontinued.

A further object of the invention is to provide a tea infuser in which the leaves are held in a perforated receptacle into which the hot water may be directly poured.

A still further object of the invention is to provide a device of the character described which will be simple in construction, comparatively inexpensive to manufacture and more efficient in use than those heretofore proposed.

With the above and other objects in view which will appear as the description proceeds, the invention consists in the novel details of construction and combinations and arrangements of parts more fully hereinafter described and particularly pointed out in the appended claims.

Referring to the accompanying drawing in which like numerals indicate like parts in all the views:

Figure 1 is a central vertical sectional view partly in elevation of a tea infuser constructed in accordance with the present invention; and, Fig. 2 is a fragmentary horizontal sectional view taken approximately on the plane indicated by the line 2—2 of Fig. 1.

Referring more particularly to the said drawing the numeral 5 indicates a tea pot or receptacle of conventional form which may be made of metal, pottery or other suitable material and which is provided with a handle 6 and a spout 7. Removably positioned within the receptacle 5 is a tubular member 8, the walls of which are provided intermediate the ends with a plurality of perforations 9. The lower end of the tubular member 8 removably receives a float member 10, the side walls of which frictionally engage the inner periphery of the tubular member 8 to maintain the float in position. The said float is provided with an upper end wall 11 and a lower end wall 12, forming an air-tight chamber 13.

The upper end of the tubular member 8 removably receives the lower end of a vessel or receptacle 15, the lower portion of which is inset as at 16, to slide within the inner periphery of the perforated tubular member 8 and to be frictionally held therein. The said vessel or receptacle 15 is provided with a bottom wall 16 which may be integrally formed with the side walls as shown, and a readily removable cover 17 is adapted to fit the open upper end of the said receptacle.

The bottom wall 16 of the receptacle 15 is provided with a central opening 18 in which is revolubly mounted a central tube 19, the lower end 20 of which is spun or otherwise formed about the edge of the opening 18 so that the said tube is retained in the said opening against longitudinal movement while at the same time it may be readily rotated therein. It will, of course, be understood that while the tube 19 may be so rotated, the parts are so formed that the frictional engagement thereof will hold the tube in any set position.

The bottom wall 16 of the receptacle 15 is provided with an aperture or perforation 21 while the lower end of the tube 19 is provided with a plurality of perforations 22 of varying diameters which are so positioned that they may be successively brought into register with the opening 21 through the rotation of the tube 19.

In use, the float member 10 is first introduced into the lower end of the perforated tubular member 8 after which a suitable quantity of tea leaves is introduced into the said member and rests upon the top wall 11 of the said float member. The receptacle 15 is then placed in position in the upper end of the tubular member 8 and the assembled parts are introduced into the tea pot 5 in substantially the positions shown in Fig. 1. Boiling water is then poured into the member 8 through the tube 19 until a water level is reached, substantially as indicated in the said figure, said level being gauged by the height to which the buoyant effect of the float causes the member 8 and the receptacle 15 to be raised. Water is also then poured into the receptacle 15 up to the top of the tube 19, which in the meantime has been located to bring the desired perforation 22 into register with the perforation 21. The weight of the tube 8 and its associated parts together with the weight of the water in the receptacle 15 will be sufficient to overcome the buoyant effect of the float 10 and the tea leaves which have been deposited in the tubular member 8 will thus be retained below the level of the water in the receptacle 5.

The water in the receptacle 15 will drip more or less rapidly through the registering openings 21 and 22, the rate of flow therethrough, of course, depending upon the size of the particular opening 22 which has been moved into register with the opening 21. As the quantity of water in the receptacle 15 diminishes, the weight thereof will, of course, be decreased until the water in the said receptacle is substantially gone, whereupon the buoyancy of the float 10 will be sufficient to overcome the weight of the member 8 and the other parts carried thereby and raise the said parts upwardly sufficiently to lift the tea leaves resting on the wall 11, above the level of the water in the receptacle 5. Of course, when the leaves are thus lifted out of the liquid, the steeping will be substantially stopped.

While one form of the invention has been illustrated and described, it is obvious that those skilled in the art may vary the details of construction as well as the precise arrangements of parts without departing from the spirit of the invention and therefore, it is not wished to be limited to the above disclosure except as may be required by the claims.

What is claimed is:

1. In a tea infuser, a receptacle; a perforated tubular member movably received in said receptacle; a float removably received within one end of said member; a water receiving receptacle removably received in the other end of said member, forming with said float and member a chamber for receiving and holding tea leaves; and a central tube rotatably carried by said last named receptacle through which water may be introduced directly into said chamber independently of said receptacle; said tube and receptacle being provided with coacting ports for controlling the flow of water from said receptacle to said chamber.

2. In a tea infuser, a receptacle; a perforated tubular member movably received in said receptacle; a float within one end of said member; a water receiving receptacle removably received in the other end of said member, forming with said float and member a chamber for receiving and holding tea leaves; and a central tube adjustably carried by said last named receptacle through which water may be introduced directly into said chamber independently of said receptacle; said tube and receptacle being provided with coacting ports for controlling the flow of water from said receptacle to said chamber.

FREDERICK HILLS NEWMAN.